United States Patent [19]
Mancusi, III et al.

[11] Patent Number: 5,582,735
[45] Date of Patent: Dec. 10, 1996

[54] REMOVAL OF ORGANICS FROM A FLUID USING A PERMEABLE MEMBRANE

[76] Inventors: Anthony W. Mancusi, III, 9203 Four Acre Ct.; Ravi Prasad, 9130 Kings Canyon Dr., both of Charlotte, N.C. 28210

[21] Appl. No.: 569,472

[22] Filed: Dec. 8, 1995

[51] Int. Cl.⁶ .................................................. B01D 15/00
[52] U.S. Cl. .................. 210/640; 95/45; 95/50; 95/52
[58] Field of Search .................... 210/640, 651, 210/653, 654, 321.79, 321.81, 500.30, 500.23, 540.42; 95/45, 50, 52

[56] References Cited

U.S. PATENT DOCUMENTS

| | | | |
|---|---|---|---|
| 3,928,294 | 12/1975 | Crawford et al. | 210/500.42 |
| 4,179,757 | 12/1979 | Crawford et al. | 3/1 |
| 4,666,644 | 5/1987 | Watson | 264/41 |
| 5,264,171 | 11/1993 | Prasad et al. | 264/103 |
| 5,352,361 | 10/1994 | Prasad et al. | 210/321.81 |

OTHER PUBLICATIONS

"Polymers For Gas Separation: The Next Decade", S. Alexander Stern, Journal of Membrane Science, 94(1994) 1–65 Elsevier Science B. V., Amsterdam.

"Hydrocarbon Vapor Recovery with Membrane Technology" by Katoh, M., et al. *NKK Technical Review* No. 56 (1989) pp. 67–72.

*Concise Encyclopedia of Polymer Science and Engineering*, John Wiley & Sons, NYC, NY (1990) pp. 674–676.

*Kirk–Othmer Encyclopedia of Chemical Technology*, 3rd Edition, John Wiley & Sons, NYC, NY (1983) vol. 21, page 966.

"Olefin/Sulfur Dioxide Copolymers", *Polymer News*, Gordon and Breach Science Publishers, Inc., vol. 3, (1976), pp. 144–146.

Gray, D. N., "The Status of Olefin-$So_2$ Copolymers as Biomaterials", *Biomedical and Dental Application*, Plenum Publishing Corporation, NYC, NY (1981) pp. 21–26.

Gray, D. N., "Polymeric Membranes for Artificial Lungs", American Chemical Society (1984).

*Primary Examiner*—Ana Fortuna
*Attorney, Agent, or Firm*—R. H. Hammer, III

[57] ABSTRACT

A method for removing condensable organics from a fluid is disclosed. A fluid contaminated with condensable organics is provided. A poly (alkyl sulfone) permeable membrane having a selectivity $\geq 20$ is provided. The fluid is passed along a surface of the membrane. The organics permeate through the membrane. The permeated organics are recycled.

7 Claims, 2 Drawing Sheets

REMOVAL OF ORGANICS FROM A FLUID USING A PERMEABLE MEMBRANE

FIELD OF THE INVENTION

This invention is related to a method for removing condensable organics from a fluid (e.g., an air or a water stream) using a permeable membrane.

BACKGROUND OF THE INVENTION

In many industrial processes, a by-product fluid (air or water) stream contaminated with minor amounts of condensable organics (i.e. vapors or liquids) is produced. For ecological reasons, it is not desirable to simply discharge these contaminated streams to the environment, especially if the type and amount of organics exceeds legal thresholds. Furthermore, it may be economically beneficial to separate the organics from the stream so that they can be recycled or otherwise disposed. Accordingly, there is a need for separating organics from by-product streams.

One approach to the solution of the organic separation problem is the use of a membrane technology. Katoh, M., et al., "Hydrocarbon Vapor Recovery with Membrane Technology", *NKK Technical Review*, Vol. 56, (1989) pp. 67–72. This approach involves a composite membrane having a permselective layer, a porous (microporous) membrane layer, and a supporting fabric. The composite membrane is in the form of a flat sheet. The composite membrane is wound to form a spiral wound module. The permselective layer is described as being ultra thin (several microns) and selectively permeating hydrocarbon or other organic vapors. The chemical composition of the permselective layer is not disclosed.

In view of the foregoing, there is a need to identify materials for use as the permselective material for removing organic vapors for effluent streams.

Poly (alkyl sulfone)s are known. See: U.S. Pat. Nos. 3,928,294 and 4,179,757; *Concise Encyclopedia of Polymer Science and Engineering*, John Wiley & Sons, New York City, N.Y. (1990) pp. 674–676; *Kirk-Othmer Encyclopedia of Chemical Technology*, 3rd Edition, John Wiley & Sons, New York City, N.Y. (1983) Vol. 21, page 966; Gray, D. N., "Olefin/Sulfur Dioxide Copolymers", *Polymer News*, Gordon and Breach Science Publisher, Inc., Vol. 3 (1976), pp. 144–146; Gray, D. N., "The Status of Olefin-SO$_2$ Copolymers as Biomaterials", *Biomedical and Dental Applications*, Plenum Publishing Corporation, New York City, N.Y. (1981) pp. 21–26; and Gray, D. N., "Polymeric Membranes for Artificial Lungs", American Chemical Society (1984).

Ultra thin poly (alkyl sulfone) coatings on microporous polypropylene (e.g., CELGARD® membranes) are known. See: Gray, "The Status . . . ", Ibid., page 24. The permselectivity (or selectivity) of that composite membrane is 4.1.

SUMMARY OF THE INVENTION

A method for removing condensable organics from a fluid is disclosed. A fluid contaminated with condensable organics is provided. A poly (alkyl sulfone) permeable membrane having a selectivity≧20 is provided. The fluid is passed along a surface of the membrane. The organics permeate through the membrane. The permeated organics are recycled.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
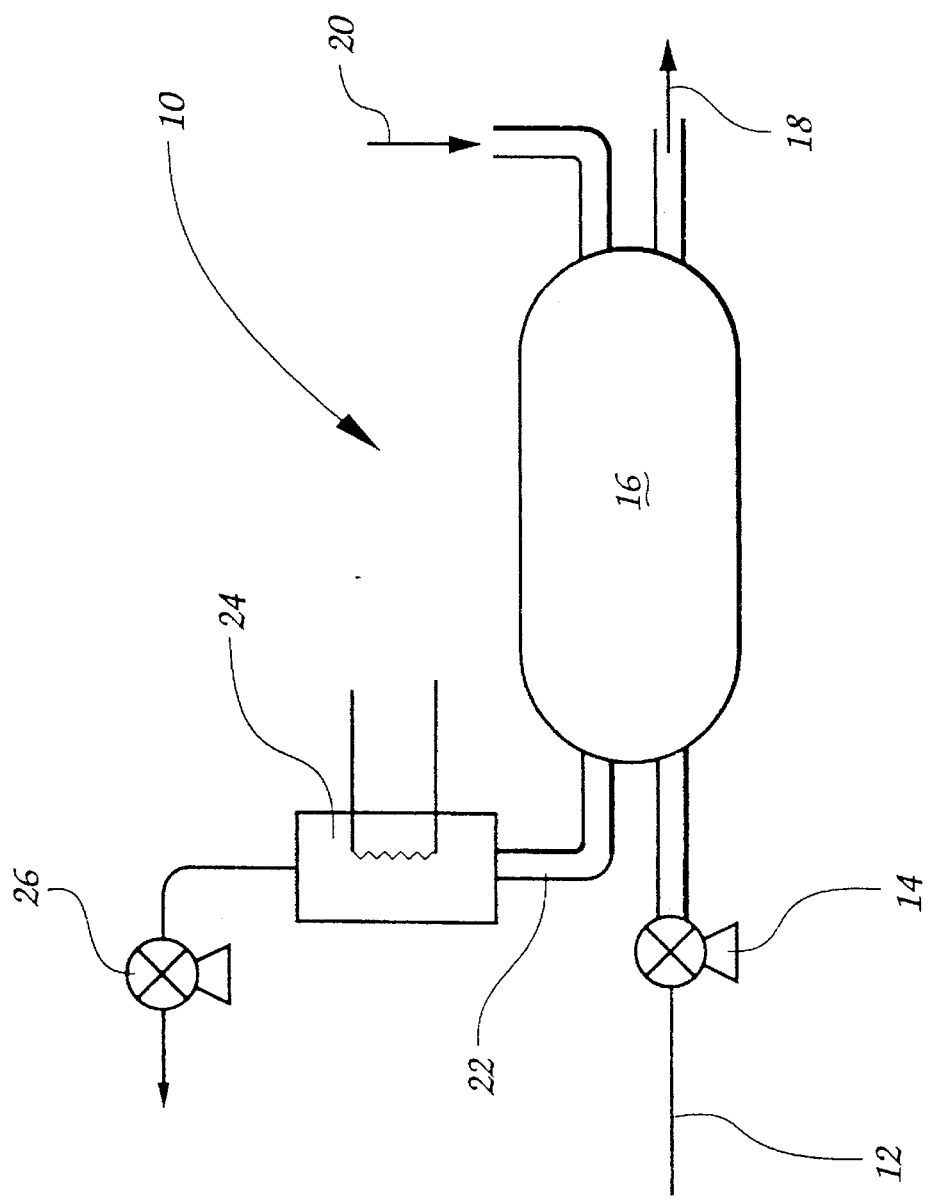
FIG. 1 is a schematic view of a system for vapor separation embodying the present invention.

A permeable membrane refers to a membrane suitable for removing condensable organics from a fluid. Such a membrane may be used in vapor separation and pervaporation processes. The instant invention is preferably used in vapor separation processes, and its importance therein is demonstrated in the appended examples. Vapor separation is a membrane separation technique for removing organics from an air stream. Pervaporation is a membrane separation technique in which organics are removed from a liquid (e.g. water). Organic or condensable organic refers to non-biological materials that are condensable, e.g., hydrocarbons. Exemplary organics include toluene, hexane, gasoline vapors, etc.

The permeable membrane has a greater affinity for the organics to be removed. For example, the permeable membrane may be made of or coated with or made with a polymer in which the target organic (i.e., the organic to be removed) has a greater affinity for or solubility in than the fluid. The membrane should have a selectivity (or permselectivity)≧20. Selectivity is a function of diffusion and sorption. Selectivity is the ratio of the permeation rate of the more permeable material to the less permeable material. The organic preferentially collects at the permeable membrane. The preferred embodiment of the instant invention, which will be discussed in greater detail below, includes a microporous substrate and a poly (alkyl sulfone) coating thereon and is discussed with relation to a vapor separation process, but is not so limited.

The microporous substrate refers to any microporous or porous permeable film. This microporous substrate functions as a support for the coating (discussed in greater detail below). The microporous substrate should not be a rate limiting element in the mass transfer of the organic across the permeable membrane. Preferably, the substrate is a polyolefinic material, most preferably polypropylene. The substrate may be in any form, for example, a flat sheet or a hollow fiber. Preferably, the substrate is a hollow fiber. Such substrates are commercially available under the trade name of CELGARD® hollow fiber microporous membranes available from Hoechst Celanese Corporation, Charlotte, N.C., USA.

The poly (alkyl sulfone) coating preferably refers to an ultra thin layer of that polymer on the substrate. The thin layer may range in thickness from about 0.1 to 10 microns and is preferably about 2–5 microns thick. The lower limit is defined so that there is sufficient polymer to attract the organic, while the upper limit is defined by the cost of polymer and by mass transfer considerations. Poly (alkyl sulfone) refers to any olefin-sulfur dioxide copolymer (also known as poly (olefin sulfone)s and poly(alkyl sulfone)s). Such poly (alkyl sulfone)s have a chemical formula of (—R—SO$_2$—R—)$_x$ where R is any suitable monomer and X>0. Such poly (alkyl sulfone)s are commercially available as Biobland PAS-16 from Anatrase. Inc. of Maumee, Ohio. USA.

The fluid may be any material, for example gas or liquid. The preferred gas is air. The preferred fluid is water. In either case, the organic must be present in the fluid at an amount of greater than or equal to 0.5% v/v.

The module refers to any contactor for housing the membrane. Preferably, the modules disclosed in U.S. Pat. Nos. 5,264,171 and 5,352,361 are used. Both of those patents are incorporated herein by reference. Preferably, the hollow fiber are incorporated into the module as fabrics. The fabrics may be woven or knitted. Preferably, the fabrics are knitted with the hollow fiber as the fill and a polypropylene fiber as the warp. Such modules are commercially available from Hoechst Celanese Corporation, Charlotte, N.C., USA under the tradename LIQUI-CEL® modules.

The organics may be recycled or disposed. A preferred recycle process is condensation.

Referring to the drawings wherein like numerals indicate like elements, there is shown in FIG. 1, a system for vapor separation 10. A feed stream 12 comprising organics (as vapor) and air is fed into module 16 via blower 14. A permeable membrane (not shown) is contained within module 16. Air 20 is fed into module 16. The organics permeates the membrane (i.e., crosses the membrane) to form permeate 22. Retentate stream 18 contains a reduced amount of organics. The organics in permeate 22 may be removed via a condensation process 24. Vacuum is maintained on the permeate 22 via vacuum pump 26. Other process configurations are also possible as will be known to one of ordinary skill. See for example, Katoh, Ibid. which is incorporated herein by reference.

Figure 2:
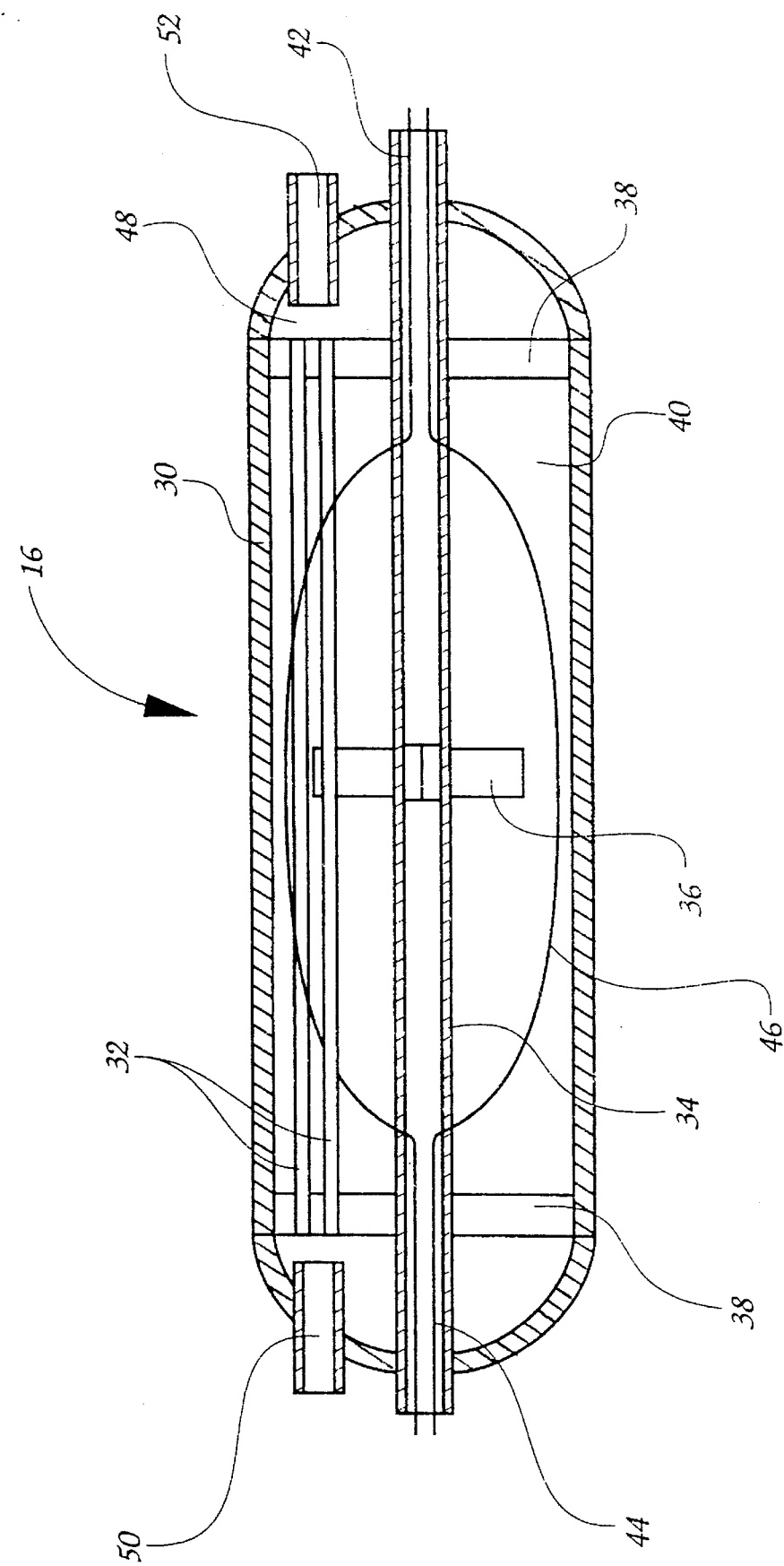
FIG. 2 is a sectional view of an embodiment of a module made according to the present invention.

Referring to FIG. 2, there is shown a preferred module 16 which is made according to U.S. Pat. No. 5,264,171. Module 16 generally comprises a shell 30 and a plurality of tubes 32. Tubes 32 are microporous hollow fibers. A center tube 34 is located along the longitudinal axis of shell 30. Center tube 34 is a perforated tube, so that fluid may ingress and egress. A baffle 36 may be affixed to center tube 34 intermediate the ends thereof. Shell 30, tube sheets 38, and the exterior surfaces of tubes 32 define shell side 40. Shell side 40 is provided with an inlet 42 and an outlet 44. The flow of material through the shell side 40 is indicated by 46. The interiors or lumenae of tubes 32 define, in part, tube side 48. Tube side 48 is provided with an inlet 50 and an outlet 52. The module 16 is not limited to the foregoing configuration.

The following Examples illustrate selected embodiments of the present invention; however, the scope of the invention should not be construed as limited to the illustrated embodiments.

EXAMPLE I

Film Preparation

A 1.25% solution of PAS-16 in THF (tetrahydrofuran) solvent was prepared. Dense films were cast from this solution by pipetting into a metal ring an amount of solution calculated to produce a film about 100 μm thick, and then allowing the THF solvent to slowly e.g. about 12 hours evaporate at about 20°–25° C. Slow evaporation was desirable to produce dense films having closely packed chains and minimal porosity.

After the films were cast and the solvent evaporated, the films were cut to fit in a test cell and their average thickness was measured.

EXAMPLE II

Film Preparation

A 4% wt solution of PAS-16 in THF (tetrahydrofuran) solvent was prepared and cast into films about 100 μm thick and placed in test cells according to the procedure set forth in Example I.

EXAMPLE III

Acetone Permeation Rate

Film samples approximately 142 μm (5.6 mils) thick having a surface (permeation) area of about 35.00 cm$^2$ in test cells made according to Examples I and II, were exposed on one (feed) side to an acetone vapor enriched nitrogen gas stream created by bubbling nitrogen gas (20°–25° C./2 psig) through liquid acetone (20°–25° C./2 psig); the gas stream passed across the surface of the film at a feed pressure of about 20.7 kPa (about 3.0 psi) and a feed flow rate of about 195.2 ml/min. A partial vacuum (737–759 torr or 29.0–29.9 in Hg) was created on the other (permeate) side of the film using a conventional vacuum pump. Acetone and nitrogen passed through the membrane at different rates, and the remainder of the gas stream passed(retentate flow rate 200 ml/min–55 ml/min) out of the cell at a pressure (retentate pressure) of about 13.8 kPa (about 2.0 psi). The test was conducted at room temperature (23.9°–30.0° C.) for about three hours (10.8×10$^3$ seconds).

Acetone vapor in the permeate stream was condensed and frozen in a liquid nitrogen trap, but the nitrogen permeate passed through the trap and was not retained. The amount of acetone permeate trapped was measured and the permeation rate of the acetone through the film sample was calculated using the following equation:

$$Q = \frac{\text{(mass permeate)}}{\text{(permeation area)} \times \text{(time)}}$$

The run time was 4.5×10$^3$ seconds. Acetone collected as permeate was 26.6 grams. The acetone flux (Q) was 16.8×10$^{-5}$ gram/cm$^2$. sec (or 64×10$^{-3}$ std.cc/cm$^2$.sec)

EXAMPLE IV

Nitrogen Permeation Rate

The film samples in test cells used in Example III were also tested for nitrogen permeability, both before and after the acetone permeation tests of Example III. Nitrogen gas was applied to one side of the film, typically at a feed pressure of 50 or 100 psi, and the time it took a given volume of nitrogen to pass through the membrane was measured using a soap bubble flow meter connected to the permeate side of the cell. Time, gas volume, and feed pressure varied, depending on the nitrogen permeability of the film sample. Permeation rates were calculated from the time and volume measurements using the following equation:

$$Q = \frac{\text{(mass permeate)}}{\text{(permeation area)} \times \text{(time)}}$$

The N$_2$ flux was 1.11×10$^{-3}$ std cc/cm$^2$.sec (under conditions identical to those set forth in example III). The selectivity (acetone/N$_2$) was 64/1.11 or 58.6.

EXAMPLE V

Fiber and Module Preparation

CELGARD® porous polypropylene hollow fibers were coated with a layer of PAS-16 by dipping the fibers in a 2.5% wt. solution of PAS-16 in THF and allowing the solvent to evaporate from the fibers. The coated fibers had a 2.5 micron thick layer of PAS-16.

These coated fibers were knitted into a fabric with a polypropylene warp fiber, and the fabric served as the membrane in a module of the type shown in FIG. 1. The module had a membrane area of 0.6 m$^2$.

EXAMPLE VI

Module Test Results

Several tests were conducted at room temperature (about 25° C.) using the module prepared as described in Example V. The nitrogen permeability rate of the module was tested essentially according to the procedure of Example IV, and determined to be $25 \times 10^{-10}$ std.cm$^3$ -cm/sec./cm$^2$/cm Hg.

Two tests each of acetone and hexane permeability were conducted at a temperature of 25° C. using a feed pressure of 5 PSIG (pounds/inch$^2$) and a feed flow rate of 1 standard cubic feet per minute (SCFM) in each of the four tests. In each test a vacuum pressure was applied to the permeate side of the membrane and the feed stream concentration and residue stream concentration of acetone or hexane permeate was measured and used to calculate the amount of permeate, the permeate flux, and the permeability for acetone or hexane. The selectivity of the membrane for acetone or hexane as compared to nitrogen was calculated by taking the ratio of organic permeability/N$_2$ permeability. These results are shown in Table 1, below:

TABLE 1

|  | Acetone Tests | | Hexane Tests | |
| --- | --- | --- | --- | --- |
| Vacuum Pressure (mmHg) | 29 | 29 | 29.5 | 29.4 |
| Inlet/Exit Concentration (% v/v) | 4.80/ 3.96 | 2.75/ 2.60 | 1.75/ 1.02 | 2.70/ 0.95 |
| Permeation Rate (cm$^3$/sec) | 3.99 | 0.712 | 3.50 | 8.31 |
| Permeate Flux (cm$^3$/sec/cm$^2$) | $66.5 \times 10^{-5}$ | $11.9 \times 10^{-5}$ | $57.8 \times 10^{-5}$ | $138 \times 10^{-5}$ |
| Permeability (cm$^3$-cm/sec/cm$^2$/cm Hg) | $103 \times 10^{-9}$ | $186 \times 10^{-9}$ | $120 \times 10^{-8}$ | $122 \times 10^{-8}$ |
| Selectivity vs Nitrogen | 41.2 | 74 | 480 | 489 |

Many variations of the present invention not illustrated herein will occur to those skilled in the art. The present invention is not limited to the embodiments illustrated and described herein, but encompasses all the subject matter within the scope of the appended claims.

We claim:

1. A method for removing condensable organic from a fluid comprising the steps of:

providing a fluid contaminated with condensable organic;

providing a poly (alkyl sulfone) permeable membrane having a selectivity $\geq 20$ for the condensable organic with respect to nitrogen;

passing the fluid contaminated with organics along a surface of the membrane;

selectively attracting the organics to the membrane permeating the organics through the membrane; and recycling the permeated organics.

2. The method of claim 1 wherein the membrane comprises a microporous substrate with a poly (alkyl sulfone) coating thereon.

3. The method of claim 2 wherein the membrane comprises a hollow fiber.

4. The method of claim 3 wherein the hollow fiber is incorporated into a fabric.

5. The method of claim 2 wherein the substrate is a polyolefin material.

6. The method of claim 5 wherein the polyolefin material is a polypropylene material.

7. The method of claim 1 wherein the membrane is incorporated into a module.

* * * * *